(12) United States Patent
Ginsberg

(10) Patent No.: US 7,640,203 B2
(45) Date of Patent: *Dec. 29, 2009

(54) ACCESSING DATA FROM A FINANCIAL PROSPECTUS

(75) Inventor: Philip M. Ginsberg, New York, NY (US)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/021,591

(22) Filed: Jan. 29, 2008

(65) Prior Publication Data

US 2008/0116286 A1 May 22, 2008

Related U.S. Application Data

(63) Continuation of application No. 09/843,093, filed on Apr. 26, 2001, now Pat. No. 7,349,873.

(51) Int. Cl.
*G06Q 40/00* (2006.01)

(52) U.S. Cl. .......................... 705/36 R; 705/35

(58) Field of Classification Search .................... 705/1, 705/35, 36 R
See application file for complete search history.

(56) References Cited

U.S. PATENT DOCUMENTS

| | | |
|---|---|---|
| 4,102,493 A | 7/1978 | Moreno |
| 5,270,922 A | 12/1993 | Higgins |
| 5,428,606 A | 6/1995 | Moskowitz |
| 5,748,931 A | 5/1998 | Jones et al. |
| 6,122,635 A | 9/2000 | Burakoff et al. |
| 6,448,979 B1 | 9/2002 | Schena et al. |
| 6,750,777 B2 | 6/2004 | Larson et al. |
| 7,349,873 B2 | 3/2008 | Ginsberg |

| | | |
|---|---|---|
| 2008/0116286 A1 | 5/2008 | Ginsberg |

FOREIGN PATENT DOCUMENTS

| | | |
|---|---|---|
| DE | 40 42 297 A1 | 7/1991 |
| DE | 196 46 636 | 5/1998 |
| DE | 100 34 082 A1 | 1/2002 |
| EP | 0 042 599 A2 | 12/1980 |
| EP | 0 354 260 A1 | 2/1990 |
| EP | 0 855 675 A3 | 7/1998 |
| JP | 08-142538 A | 6/1996 |
| JP | 10-203051 | 8/1998 |
| JP | 11-348470 | 12/1998 |

OTHER PUBLICATIONS

Boros, Multimedia White Paper, Dec. 1999.

(Continued)

*Primary Examiner*—Richard C Weisberger

(57) ABSTRACT

A first portion of data is selected. The first portion of data is capable of being converted from a human-readable format to an electronically readable format. The first portion of data is capable of being stored in an optical bar code. A printed financial prospectus includes the first portion of data in the human-readable format. The first portion of data is stored on the optical bar code. The optical bar code is incorporated into the printed financial prospectus. The first portion of data is read from the optical bar code using a bar code scanner without removing the optical bar code from the printed financial prospectus.

25 Claims, 3 Drawing Sheets

OTHER PUBLICATIONS

Office Action for U.S. Appl. No. 09/843,093, mailed Dec. 16, 2004 (9 pp.).

Office Action for U.S. Appl. No. 09/843,093, mailed Oct. 7, 2005 (6 pp.).

Office Action for U.S. Appl No. 09/843,093, mailed Jul. 19, 2006 (6 pp.).

Office Action for U.S. Appl. No. 09/843,093, mailed Jan. 24, 2007 (7 pp.).

International Search Report for Application No. PCT/US02/11413, mailed Dec. 12, 2002 (3 pp.).

Search Report for European Patent Application No. EP 02252884.8-2210, mailed Aug. 8, 2002 (3 pp.).

Examination Report for European Patent Application EP 02252884.8-2210, mailed Mar. 25, 2004 (4 pp.).

Examination Report under Section 18(3) for UK Patent Application GB0326270.6, dated Sep. 7, 2004 (3 pp.).

Examination Report under Section 18(3) for UK Patent Application GB0326270.6, dated May 27, 2005 (3 pp.).

Examination Report under Section 18(3) for UK Patent Application GB0326270.6, dated Oct. 27, 2005 (3 pp.).

|  | PERIOD FROM INCEPTION THROUGH ~~~ | ~~~ | YEAR ENDED DECEMBER 31, | ~~~ | ~~~ | SIX MONTHS ENDED JUNE 30, | |
|---|---|---|---|---|---|---|---|
| STATEMENT OF OPERATION DATE: | ~~~ | ~~~ | ~~~ | ~~~ | ~~~ | ~~~ | ~~~ |
| NET REVENUES............. | $ -- | $ -- | $ -- | $ -- | $ -- | $ -- | $ -- |
| OPERATING EXPENSES: | | | | | | | |
|    RESEARCH AND DEVELOPMENT........ | ~~~ | ~~~ | ~~~ | ~~~ | ~~~ | ~~~ | ~~~ |
|    SALES AND MARKETING.. | ~~~ | ~~~ | ~~~ | ~~~ | ~~~ | ~~~ | ~~~ |
|    GENERAL AND ADMINISTRATIVE....... | ~~~ | ~~~ | ~~~ | ~~~ | ~~~ | ~~~ | ~~~ |
|    DEFERRED STOCK COMPENSATION...... | -- | -- | ~~~ | ~~~ | ~~~ | ~~~ | ~~~ |
| OPERATING LOSS.......... | ~~~ | ~~~ | ~~~ | ~~~ | ~~~ | ~~~ | ~~~ |
| INTEREST INCOME (EXPENSE), NET.......... | ~~~ | ~~~ | ~~~ | ~~~ | ~~~ | ~~~ | ~~~ |
| NET LOSS................ | ~~~ | ~~~ | ~~~ | ~~~ | ~~~ | ~~~ | ~~~ |
| ACCRETION ON REDEEMABLE CONVERTIBLE PREFERRED STOCK................ | ~~~ | ~~~ | ~~~ | ~~~ | ~~~ | ~~~ | ~~~ |
| NET LOSS ATTRIBUTABLE TO COMMON STOCKHOLDERS.. | ~~~ | ~~~ | ~~~ | ~~~ | ~~~ | ~~~ | ~~~ |
| NET LOSS PER COMMON SHARE (BASIC AND DILUTED)............... | ~~~ | ~~~ | ~~~ | ~~~ | ~~~ | ~~~ | ~~~ |
| PRO FORMA NET LOSS PER SHARE BASIC AND DILUTED)............... | | | | | $ ~~~ | | $ ~~~ |
| WEIGHTED AVERAGE SHARES OUTSTANDING (BASIC AND DILUTED).............. | ~~~ | ~~~ | ~~~ | ~~~ | ~~~ | ~~~ | ~~~ |
| SHARES USED IN CALCULATION OF PRO FORMA NET LOSS PER SHARE BASIC AND DILUTED(1)............. | | | | | ~~~ | | ~~~ |

|  | AS OF DECEMBER 31, | | | | | | |
|---|---|---|---|---|---|---|---|
| BALANCE SHEET DATA: | | | | | | | |
| CASH AND CASH EQUIVALENTS... | ~~~ | ~~~ | ~~~ | ~~~ | ~~~ | ~~~ | ~~~ |
| WORKING CAPITAL (DEFICIT)...... | ~~~ | ~~~ | ~~~ | ~~~ | ~~~ | ~~~ | ~~~ |
| TOTAL ASSETS................. | ~~~ | ~~~ | ~~~ | ~~~ | ~~~ | ~~~ | ~~~ |
| LONG-TERM OBLIGATIONS, NET OF CURRENT PORTION........ | ~~~ | ~~~ | ~~~ | ~~~ | ~~~ | ~~~ | ~~~ |
| TOTAL STOCKHOLDERS' EQUITY (DEFICIT)................. | ~~~ | ~~~ | ~~~ | ~~~ | ~~~ | ~~~ | ~~~ |

ACCESSING DATA FROM A FINANCIAL PROSPECTUS

This application is a continuation of U.S. patent application Ser. No. 09/843,093, filed Apr. 26, 2001 now U.S. Pat. No. 7,349,873, which is hereby incorporated by reference in its entirety.

BACKGROUND OF THE INVENTION

This invention relates to automation processes for accessing financial prospectus data. More particularly, this invention relates to methods and systems for enabling users of prospectuses to easily access the financial information contained therein.

A prospectus is a written document providing information concerning an offering of financial securities. A prospectus contains narrative information on, for instance, the type and classification of security, the type of business associated with a security, potential risk factors, use of proceeds, and security voting rights. A prospectus may also include both consolidated and detailed financial information on the associated business and the security itself. Information in the form of data in the prospectus may, for instance, include underwriter compensation, dilution data, operations data, summary of accounting policies, inventories, property and equipment, leases and other assets, short-term borrowing and long-term debt, employee benefit plans, management salaries, income taxes and authorization of common and preferred stock. The amount of data contained in a prospectus may be extensive.

Prospectuses are available in printed form, typically as a booklet, suitable for distribution to potential purchasers of securities. If the prospectus is associated with a federally-regulated security, it has to be submitted to the Securities Exchange Commission (SEC) where it is entered into their Electronic Data Gathering, Analysis, and Retrieval System (EDGAR). The prospectus information is then accessible by the general public over the SEC-maintained database. The files in EDGAR are in either plain text or Hypertext Mark-up Language (HTML) form. Unofficial Portable Document Format (PDF) files may also be submitted to the SEC. All of these file types are in a human-readable form but not in electronically readable form. Further, the information and data contained in financial prospectuses may be in a variety of formats and arrangements which may make the information and data difficult to read, analyze and interpret.

Therefore, the information and data presented in prospectuses may be difficult to manage because of its volume, form, format and arrangement. Thus, it is desirable to provide methods and systems for prospectus data management. Such methods would facilitate the provision of data in a manner that is electronically accessible and more easily usable.

SUMMARY OF THE INVENTION

These and other objects of the invention are accomplished with the principle of the present invention by providing methods and systems for prospectus data management.

In accordance with the invention, these methods and systems provide prospectus data management by the use of electronically readable media incorporated into (e.g., encapsulated on the cover) a printed prospectus where the media stores important financial information and data. The prospectus information is therefore available in both a human-readable and electronically readable format. The electronically readable media may be in the form of, for instance, bar codes, magnetic strips or embedded chips. The data can be read from the prospectus using a suitable device. Multiple electronically readable media types may be provided for storage of different data, i.e. salaries, assets, etc. The prospectus data that is electronically readable may be in a summary form. The data may also be in a standardized form. Additionally, the electronically readable information and data may be in an encrypted form where decryption software is subsequently needed to read data.

BRIEF DESCRIPTION OF THE DRAWINGS

These and other objects and advantages of the invention will become apparent upon reading the following detailed description and upon reference to the drawings in which:

FIG. 2 is a depiction of a table in accordance with one embodiment of the present invention where the data table shown could be of a type found in a securities' prospectus.

DETAILED DESCRIPTION OF THE PREFERRED EMBODIMENTS

Figure 1:
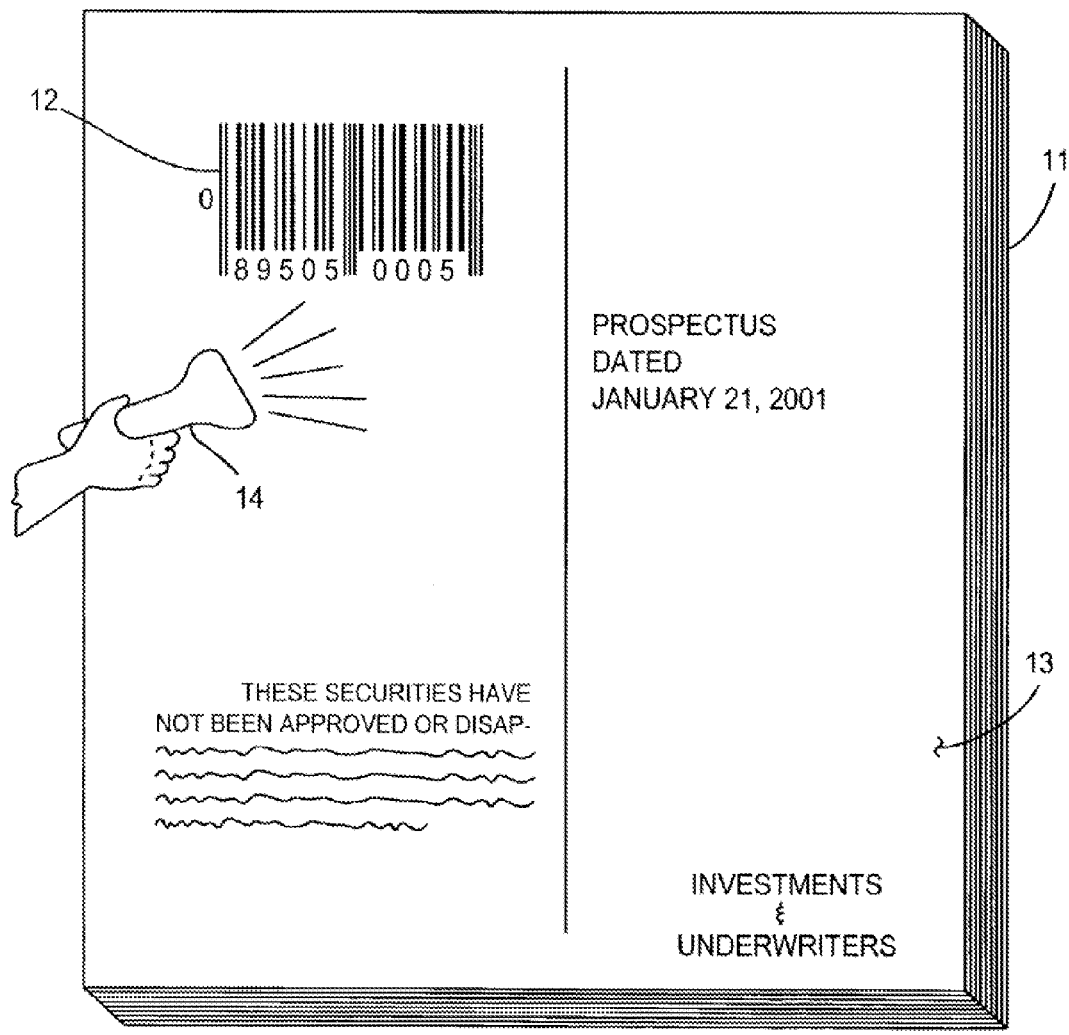
FIG. 1 is a depiction in accordance with one embodiment of the present invention showing the front cover of a printed prospectus with an electronically readable media encapsulated on it.

An illustrative depiction of a system 10 in accordance with certain embodiments of the present invention is shown in FIG. 1. The prospectus may be presented to a user in a conventional, human-readable, printed form 11. Typically, the printed matter is in a booklet form. Electronically readable media 12 may be encapsulated on the cover 13 of the printed prospectus. The electronically readable media may be optical bar codes, magnetic strips, embedded computer chips or any other suitable readable electronic data storage media. There may be multiple electronically readable media 12 types encapsulated on the prospectus cover containing different categories of data such as salary, assets, underwriter information, etc. The information contained in the electronically readable media may be read using a suitable device 14 by a user. For example, device 14 may be a bar code scanner, smart card scanner, or any other suitable device connected to a personal, portable, or hand-held computer, or any other suitable device.

The information contained in the electronically readable media 12 may contain voluminous data tables such as those shown in FIG. 2. Data tables 20 may include information such as the previous performance of securities for the business, borrowing information, information on the security itself, and any other prospectus data as is well known in the art.

Figure 3:
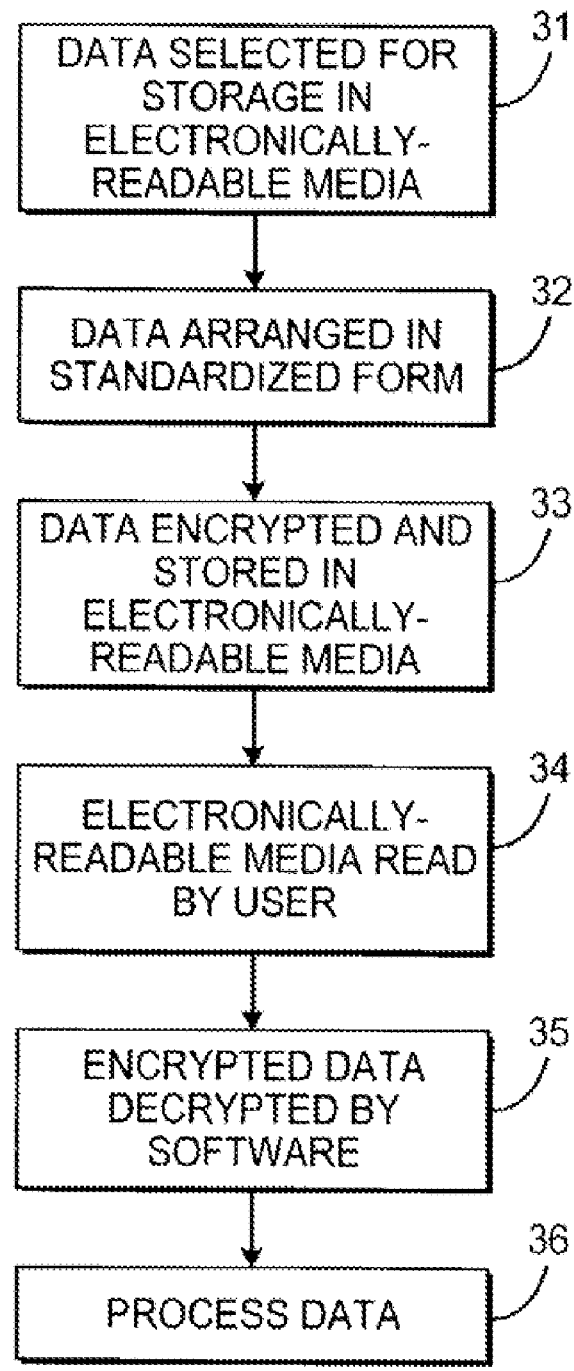
FIG. 3 is a flow chart of the process in accordance with one embodiment of the present invention in which the prospectus electronically readable media is accessed.

One embodiment of a process 30 for using system 10 is shown in FIG. 3. As illustrated, at step 31, specific information and data from the prospectus may be reviewed and chosen for inclusion in the electronically readable media. The data chosen may be included in a summarized form—that is, not all prospectus data but only selected portions may be chosen for inclusion in the electronically readable media.

The data may be stored in a standardized format to facilitate ease of data reading, and subsequent interpretation and analysis. In particular, the use of standardized data forms may allow subsequent mathematical manipulation of financial data in a more efficient manner. For instance, the data may be contained in a standardized format so that, when read, it may be in an appropriate input form to a database where mathematical algorithms may subsequently be applied. The process of arrangement of the data in a standardized form is shown at step 32.

At step 33, the information and data may be converted to an encrypted form in one embodiment using any of a wide variety of mathematical encryption methods as known in the art. The encrypted data may then be stored in the electronically readable media 12.

At step 34, the information and data may be read from the electronically readable media 12 using a suitable device. For instance, a bar code may be read by an optical scanner. The prospectus information and data may be transferred to and stored on a variety of suitable computer systems, including, but not limited to, personal computers. If data had been encrypted, decryption software installed on a personal computer, or other suitable device, may be needed to convert information to a decrypted form as illustrated by step 35. Encryption of the information and data may be used, for instance, to restrict reading of data to users who had purchased the decryption software.

Finally, the data may be processed on the computer to aid the user in evaluating the subject of the prospectus, as shown at step 36. This processing may include generating graphs, spreadsheet tables, or any other suitable data processing technique as known in the art.

Thus, it is apparent that it has been provided, in accordance with the invention, a prospectus data management system that fully satisfies the objects, aims and advantages set forth above. While the invention has been described in conjunction with specific embodiments thereof, it is evident that many alternatives, modifications and variations as fall within the spirit of the appended claims exist.

What is claimed is:

1. A method, comprising:
    selecting a first portion of data, the first portion of data being capable of being converted from a human-readable format to an electronically readable format, and being capable of being stored on an optical bar code, wherein a printed financial prospectus comprises the first portion of data in the human-readable format;
    storing the first portion of data on the optical bar code;
    incorporating the optical bar code into the printed financial prospectus; and
    reading the first portion of data from the optical bar code using a bar code scanner without removing the optical bar code from the printed financial prospectus.

2. The method of claim 1, further comprising:
    selecting a second portion of data, wherein the printed financial prospectus comprises the second portion of data;
    storing the second portion of data on an electronically readable medium; and
    incorporating the electronically readable medium into the printed financial prospectus.

3. The method of claim 2, wherein:
    the first portion of data comprises a first category of information associated with the printed financial prospectus; and
    the second portion of data comprises a second category of information associated with the printed financial prospectus, wherein the first category of information is different from the second category of information.

4. The method of claim 1, wherein storing the first portion of data comprises:
    storing the first portion of data on the optical bar code in a summary format.

5. The method of claim 1, wherein storing the first portion of data comprises:
    storing the first portion of data on the optical bar code in a standardized format.

6. The method of claim 1, wherein:
    the printed financial prospectus comprises two or more of the following plurality of data types: security information, classification information, consolidated financial information, inventory information, dilution data, asset information, debt information, past performance information, management salary information, tax information, underwriter compensation information, and operations data; and
    the first portion of data comprises a first one of the plurality of data types.

7. A method, comprising:
    receiving a printed financial prospectus, the printed financial prospectus comprising:
        a first portion of data in a human-readable format, the first portion of data being capable of being converted from the human-readable format to an electronically readable format, and being capable of being stored on an optical bar code; and
        the optical bar code, wherein the optical bar code is incorporated into the printed financial prospectus;
    storing the first portion of data on the optical bar code; and
    reading the first portion of data from the optical bar code using a bar code scanner without removing the optical bar code from the printed financial prospectus.

8. The method of claim 7, wherein the printed financial prospectus further comprises:
    a second portion of data, and
    an electronically readable medium incorporated into the printed financial prospectus, the electronically readable medium configured to store the second portion of data.

9. The method of claim 8, wherein:
    the first portion of data comprises a first category of information associated with the printed financial prospectus; and
    the second portion of data comprises a second category of information associated with the printed financial prospectus, wherein the first category of information is different from the second category of information.

10. The method of claim 7, wherein:
    the printed financial prospectus comprises two or more of the following plurality of data types: security information, classification information, consolidated financial information, inventory information, dilution data, asset information, debt information, past performance information, management salary information, tax information, underwriter compensation information, and operations data;
    the first portion of data comprises a first one of the plurality of data types.

11. The method of claim 7, wherein storing the first portion of data comprises:
    storing the first portion of data on the optical bar code in a summary format.

12. The method of claim 7, wherein storing the first portion of data comprises:
    storing the first portion of data on the optical bar code in a standardized format.

13. The method of claim 1, wherein incorporating the optical bar code into the printed financial prospectus comprises:
    encapsulating the optical bar code on a cover of the printed financial prospectus.

14. The method of claim 1, wherein incorporating the optical bar code into the printed financial prospectus comprises:
 affixing the optical bar code to the printed financial prospectus.

15. The method of claim 2, further comprising:
 reading the second portion of data from the electronically readable medium using a device without removing the electronically readable medium from the printed financial prospectus.

16. The method of claim 15, wherein the electronically readable medium comprises a magnetic strip.

17. The method of claim 15, wherein the electronically readable medium comprises a computer chip and the device is connected to a computer.

18. The method of claim 15, wherein the electronically readable medium comprises a second optical bar code and the device comprises the bar code scanner.

19. The method of claim 7, wherein the optical bar code is incorporated into the printed financial prospectus such that the optical bar code is encapsulated on a cover of the printed financial prospectus.

20. The method of claim 7, wherein the optical bar code is incorporated into the printed financial prospectus such that the optical bar code is affixed to the printed financial prospectus.

21. The method of claim 8, further comprising:
 reading the second portion of data from the electronically readable medium using a device without removing the electronically readable medium from the printed financial prospectus.

22. The method of claim 21, wherein the electronically readable medium comprises a magnetic strip.

23. The method of claim 21, wherein the electronically readable medium comprises a computer chip and the device is connected to a computer.

24. The method of claim 21, wherein the electronically readable medium comprises a second optical bar code and the device comprises the bar code scanner.

25. The method of claim 8, further comprising:
 storing the second portion of data on the electronically readable medium.

* * * * *